Patented May 30, 1939

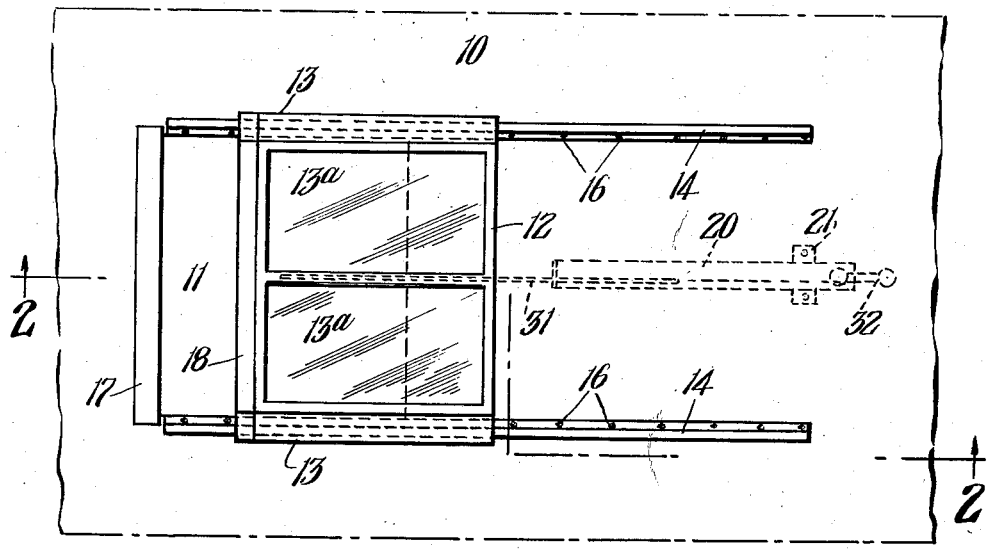
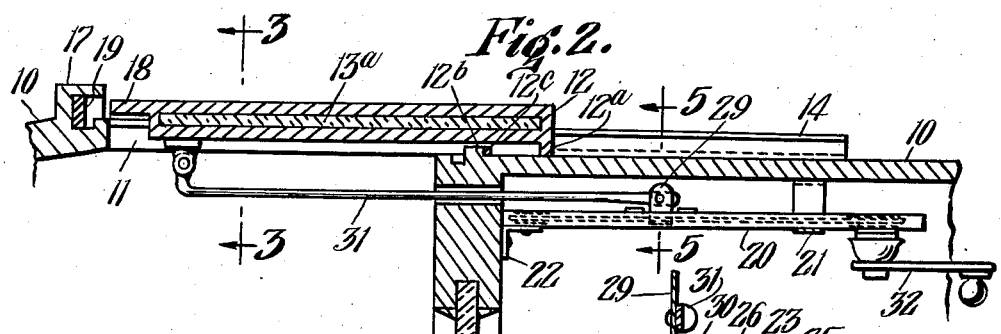
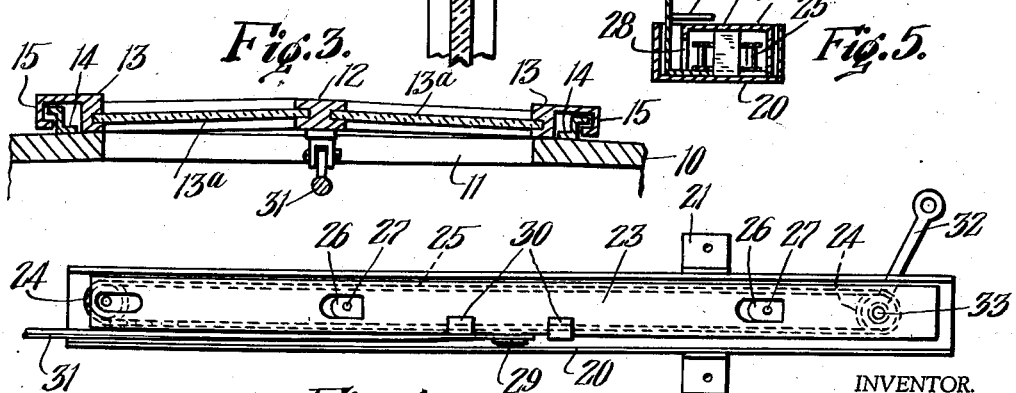

2,160,366

UNITED STATES PATENT OFFICE 2,160,366

SLIDING ROOF PANEL

Michael Marchenko, New York, N. Y.

Application June 3, 1937, Serial No. 146,176

1 Claim. (Cl. 268—1)

This invention relates to improvements in sliding roof panels for vehicles such as motorcoaches, taxicabs, motor-boats and cabin airplanes.

Objects

Among the principal objects which the present invention has in view are: to provide a sliding panel on the roof of a vehicle whereby the same in open position will permit air to enter through an opening into the vehicle; to provide accessible means for sliding the roof panel horizontally and in a forwardly and rearward direction with respect to the roof of the vehicle; to provide means on the vehicle roof whereby the roof panel is prevented from becoming dislodged and to readily be guided in its forward or rearward movement; to enable the roof panel to be moved in a limited forward direction for permitting air to enter through the roof opening into the interior of the vehicle; to be enabled to move the roof panel rearwardly from open position to entirely close the roof opening during adverse weather conditions; to secure simplicity of construction and operation; and to obtain other advantages and results from the following description.

Drawing

Figure 1 is a plan view illustrative of a roof of a vehicle and showing my improved sliding roof panel and means for operating the same;

Figure 2 is an enlarged longitudinal sectional view shown as taken on line 2—2 of Figure 1;

Figure 3 is a transverse sectional view shown as taken on line 3—3 of Figure 2;

Figure 4 is a plan view of the mechanism for operating the roof panel; and

Figure 5 is a sectional view shown as taken on line 5—5 of Figure 4.

Description

As seen in the drawing, and referring now more particularly to Figures 1 to 3 there is shown a vehicle roof 10 in which is provided an opening 11 towards the rear or passenger compartment of the vehicle and adapted to be closed or uncovered by a longitudinally slidable roof panel 12. Said slidable roof panel 12 preferably may be constructed to provide unbreakable or shatterproof glass or like transparency medium, whereby when in closed position over the opening 11, passengers who may be riding in the vehicle will have an unobstructed view and be shielded from any inclemencies of the weather, as well as protected from any possible shattering of the transparency medium. With the slidable roof panel moved into open position from the opening 11, as may be done during pleasant weather, the passengers then may enjoy additional fresh air along with that entering the vehicles by virtue of open windows (not shown), as well as having the benefit of unfiltered sunlight from above.

The panel preferably comprises a sash having sides 13, 13 as part of the frame in which the transparency medium 13a is mounted. Said sides 13, 13 of the panel may be guided conveniently in L-shaped tracks 14, 14 arranged along the sides of the opening 11 and extending from the rear thereof to the forward part of the roof a sufficient distance whereby the roof panel, when slid forwardly of the opening, will still be within and not become dislodged from the tracks. The side members 13, 13 of the panel 12 preferably extend outwardly from the sides and then downwardly and inwardly to form L-shaped guideways 15, 15. The inwardly directed lip 15a of each side member is adapted to engage under an outwardly directed rail edge of an L-shaped track 14. Said side members will, therefore, for this entire length completely overlie the tracks in use, thereby preventing seepage of water into the vehicle during inclement weather. The tracks 14, 14 for convenience, are preferably made fast to the roof 10 as by screws 16 and may easily be replaced if necessary by removing said screws. Adjacent the opening 11 at the edge thereof next the back of the vehicle and upon the upper side of roof 10 is provided a forwardly directed cross member or housing 17 for receiving flashing extension 18 on the rear edge of the panel 12 when said panel is slid rearwardly for closing the opening. Said cross member or housing, as viewed in section, may be channelled as seen in Figure 2 and may be an integral part of the roof construction or otherwise as found desirable. The channel preferably extends the full width of opening 11, and within the channel and extending entirely across the same is a cushioning means, such as a rubber gasket 19 against which the rear edge of extension 18 of the panel 12 snugly abuts, and in addition to constituting a cushioning means and stop for the panel, serves as a seal against water entering the vehicle during a rain or other unfavorable weather conditions. The forward edge of the panel depends, as at 12a between the tracks to substantial engagement with the top of the roof, and at the forward edge of the opening 11 the roof provides a groove or gutter 10a in advance of which is an upstanding bead or rib 10b extending from track to track. The forward face of this bead may likewise have a cushioning and sealing gasket of rubber, felt or other material extending across from track to track and engageable by the rear face of the depending front-piece 12a of the panel when the panel is slid rearwardly. Thus the panel will be cushioned and sealed at its front edge as just described as well as at its rear edge as previously described to prevent entry of water thereat during rain or other inclement conditions, and both will effectively seal against cold air in winter or at other times when such circumstance is not desired.

In carrying out the invention, suitable means may be utilized for operating the panel for opening and closing the same. In the specific embodiment herein illustrated, such means may be a rectangular housing or member 20 suspended from the under side of the roof of the driver's compartment of the vehicle and held in place to the roof adjacent its forward end as by a bracket 21, and at its rear end by another bracket 22 securing said end to the partition wall or that part of the vehicle separating the passenger compartment and the driver's compartment. The driver of such vehicle being enabled at all times to operate the panel. The said rectangular housing or member in cross-section is a channel of U-shape, as in Figures 4 and 5, and within said housing is provided another U-shaped member 23 but is inverted with respect to the first; the reason thereof will be apparent from the following. Adjacent each end and within the members 20 and 23 are sprockets 24, 24 for receiving an endless sprocket chain 25 thereon, with said sprockets and sprocket chain entirely enclosed within the walls of the members 20 and 23. In order that the respective members 20 and 23 may be held fast to each other, the member 23 may have its base wall stamped at spaced intervals with the material or tongues 26 thereof bent at right angles to the base wall and then longitudinally parallel thereto in offset position to engage the inside of the base wall of the member 20. Screws 27 in the offset portions of tongues 26 and the base wall of the other channel will thus hold the two channels assembled. Said tongues likewise may be utilized as guides for the sprocket chain when in operation. Should, for any reason, the mechanism breakdown within the members 20 and 23, repair or replacement may be readily made by first removing the screws 27 and then releasing the channel member 23 from its position in the channel member 20.

As shown in Figures 4 and 5, inner channel member 23 is slotted longitudinally on one side, with the slot 28 extending substantially the entire length of the channel. Attached to the reach of the sprocket chain next said slot 28 is an L-shaped bracket 29 having a longer end protruding through said slot and upwardly beyond the top of the housing or members 20 and 23. At forward and rear edges of said brackets 29, the material is bent to form laterally directed finger or guides 30 immediately outside of channel member 23 substantially in flatwise but sliding engagement therewith for guiding purposes to prevent the bracket from tilting. A longitudinally disposed rod 31 extending in the same direction of sliding movement of the slidable panel 12 and longitudinally parallel to the channel members 20 and 23, is attached to the under side of the panel adjacent the mid part of the rear end portion thereof. The forward end of said rod may conveniently be flattened and attached to the protruding end of the bracket 29. It may here be said that the rod 31 preferably is close to the roof inside the vehicle in order that it will not interfere with the comfort of any passengers who may be in the vehicle. As operation of the slidable panel 12 is preferably under control of the driver, it is preferred that housing members 20 and 23 be within the driver's compartment and that the rod pass through an opening provided in the partition or separating wall between the driver and passenger compartments. In assemblying the parts, the rod may be inserted through the opening before an end of the rod, such as the forward end, is attached in place.

In operation, when desiring to move the sliding panel 12 in either direction, there is provided a crank handle 32 adjacent the forward end of the members 20 and 23 connected to the forward sprocket wheel 24 as by a shaft 33. Turning the crank handle in either direction will cause the forward sprocket to rotate and actuate the sprocket chain, thereby moving bracket 29, rod 31 and in turn either sliding the panel 12 away from the opening 11 or to close the opening according to direction of movement imparted to the sprocket chain. A few turns of the crank handle in either direction will permit limited sliding of the panel over or away from the opening 11 depending upon the wishes of the passenger.

Obviously detail changes and modifications may be made in the construction and use of my improved sliding panel without departing from the spirit or scope of the invention, and I do not wish to be understood as limiting myself to the exact construction or operation shown or described except as set forth in the following claim when construed in the light of the prior art.

I claim:

A sliding roof panel of the character described adapted to open and close an opening in a roof of a vehicle, said sliding roof comprising a window enclosed within a frame and slidable in a pair of parallelly spaced tracks on said roof, means for operating the sliding panel in said tracks, said means comprising a rectangular member closed on one side and having a pair of sprocket gears fixedly secured adjacent each outer end thereof, said gears having a sprocket chain, a protruding L-shaped bracket attached to said sprocket chain for carrying one end of an elongated rod the other end of said rod secured to the underside of the forward end of the sliding panel, and one of said sprocket gears furthest from the forward end of the rod having a downwardly directed crank handle adapted to actuate the sprocket chain and rod thereby moving the said sliding panel for opening and/or closing the open part of the roof.

MICHAEL MARCHENKO.